United States Patent [19]

Gupta et al.

[11] Patent Number: 5,319,586
[45] Date of Patent: Jun. 7, 1994

[54] METHODS FOR USING A PROCESSOR ARRAY TO PERFORM MATRIX CALCULATIONS

[75] Inventors: Subhash Gupta, Chicago; Ravi Mehrotra, Palatine, both of Ill.

[73] Assignee: Texas Instruments Incorporated, Dallas, Tex.

[21] Appl. No.: 18,343

[22] Filed: Feb. 16, 1993

Related U.S. Application Data

[63] Continuation of Ser. No. 458,207, Dec. 28, 1989, abandoned.

[51] Int. Cl.[5] .......................... G06F 15/32; G06F 7/00
[52] U.S. Cl. ..................................... 364/735; 364/736
[58] Field of Search ............ 364/735, 736, 754, 715.04

[56] References Cited

U.S. PATENT DOCUMENTS

| | | | |
|---|---|---|---|
| 4,639,857 | 1/1987 | McCanny et al. | 364/754 |
| 4,727,503 | 2/1988 | McWhirter | 364/754 |
| 4,787,057 | 11/1988 | Hammond | 364/754 |

OTHER PUBLICATIONS

M. L. James et al., "Applied Numerical Methods for Digital Computation with Fortran and CSMP", 1977, pp. 642-644.

Primary Examiner—Long T. Nguyen
Attorney, Agent, or Firm—W. Daniel Swayze, Jr.; Leo N. Heiting; Richard L. Donaldson

[57] ABSTRACT

An apparatus and method for performing matrix calculations is provided. The apparatus comprises a computer system having a linearly connected array of processors. Each processor has three inputs, two of which receive data along the linear array. The processors are configured to perform certain multiply-add operations. The methods permit speeded up solution of systems of linear equations and matrix inversion. The methods involve manipulating the matrices and the unknown vector values such that the problem can be solved using vector orthogonalization techniques.

32 Claims, 4 Drawing Sheets

# METHODS FOR USING A PROCESSOR ARRAY TO PERFORM MATRIX CALCULATIONS This application is a continuation of application Ser. No. 07/458,207, filed Dec. 28, 1989, now abandoned.

TECHNICAL FIELD OF THE INVENTION

This invention generally relates to computer processing, and more particularly to a processor array for performing calculations involving matrices.

BACKGROUND OF THE INVENTION

Linear equations occur frequently in all branches of science and engineering, and effective methods are needed for solving them. Furthermore, many science and engineering problems lead not to a single equation, but to a system of equations. The object of solving the system is to find values of all unknowns that satisfy all equations simultaneously.

The values of the solution set of a system of linear equations depend on the coefficients, $a_{ij}$, of the system. The rectangular array of these coefficients in their m rows and n columns is called an $m \times n$ matrix A. Various methods for solving systems of linear equations use various operations on matrices, such as addition of or multiplication by a scalar, a vector, or another matrix. These methods have varying degrees of complexity, and the simpler methods are often limited to special cases or well conditioned matrices.

Another calculation involving matrices is matrix inversion. The conventional method of matrix inversion treats the matrix as a system of linear equations, but has a solution complexity of $O(n^3)$.

In performing calculations with matrices, especially when working with a large number of coefficients, it is desirable to use a computer to take the place of human calculations. Criteria for solution methods include processing speed and the number of processors required by a desired solution.

Processing speed is related to the ability to "parallelize" a calculation. Parallelization means that multiple operations may be performed simultaneously, thereby reducing the time required to obtain the desired result. Yet, many existing parallel methods involving matrix calculations are limited to well conditioned matrices. Another problem with existing methods is a susceptibility to round off errors.

Furthermore, existing parallel processing methods have sizable hardware demands. Thus, although some methods have reduced calculation complexity to $O(n)$ and $O(n^2)$, they require a large number of processors. Other methods permit the calculation to be decomposed for a fixed number of processors, but invite decomposition penalties.

Thus, there is a need for a parallel processing system that speeds up calculations involving matrices. The processing system should accommodate general cases and permit the use of robust algorithms. For calculations with large matrices, the processing system should also not demand a large number of processors and permit decomposition without penalties. Finally, the system should maximize the speedup obtainable for a given number of processors.

SUMMARY OF THE INVENTION

One aspect of the invention is a computer system for performing calculations involving matrices. The computer system comprises a host processor system and a linear array of processors. Each processor has two horizontal inputs, which travel in opposite directions, and one vertical input. Each processor is configured to perform multiply-add operations on values associated with a matrix and a vector. The system includes timing and control devices such that the processor array operates systolically, i.e., each processor accepts results from an adjacent processor, operates on the data, and passes it to a next processor.

Two additional aspects of the invention are a method of using a computer system to solve a system of linear equations and a method of using a computer system to invert a matrix. Both methods manipulate a set of vectors representing rows of matrix coefficients so that the solution may be obtained using a vector orthogonalization process. This orthogonalization process, as well as other steps of the methods, may be performed on a linear processor array.

A technical advantage of the invention is that matrix-vector calculations are speeded up. When solving a system of linear equations on a processor array having k processors, a speedup of a factor of k can be achieved. In other words, if the solution time with one processor is T, the speedup for a solution on k processors is T/k. Similarly, the problem of matrix inversion can be speeded up by a factor of k on a k processor array. The invention avoids the problems of instability associated with other matrix calculations due to required precision and roundoff error.

BRIEF DESCRIPTION OF THE DRAWINGS

The novel features believed characteristic of the invention are set forth in the appended claims. The invention itself, however, as well as modes of use and advantages, is best understood by reference to the following description of illustrative embodiments and the accompanying drawings.

DETAILED DESCRIPTION OF THE INVENTION

Related Invention

This invention describes a linear processor array, similar to, but performing different calculations than, the linear processor array described in a copending application entitled "Speedup for Solution of Systems of Linear Equations", Ser. No. 07/428,384, filed Oct. 27, 1989. The copending application is hereby incorporated by reference in its entirety.

Processor Hardware

Figure 1:
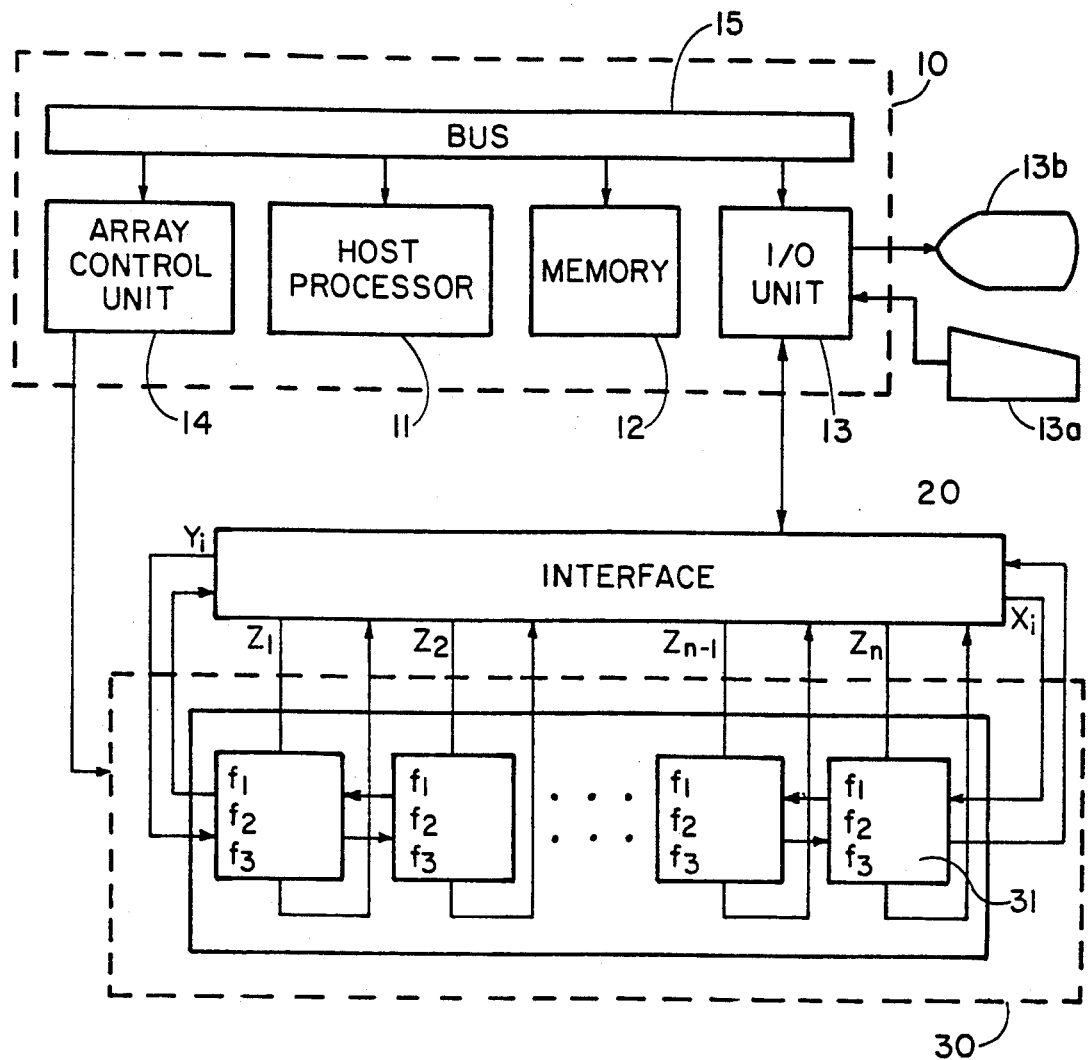
FIG. 1 is a block diagram of a computer system for performing matrix-vector calculations in accordance with the invention.

FIG. 1 is a block diagram of one embodiment of the hardware of the invention, a computer system for performing matrix calculations. The system has three basic components: host system 10, interface unit 20, and linear processor array 30.

Host system 10 is simply a standard processor-based digital computing system. A feature of the invention is that host system 10 does not impose significant restraints on processor array 30. Host system 10 provides inputs and retrieves outputs to and from the processor array 30, but does not alter the order of the data provided to the processor array 30 as a result of the values computed by processor array 30. Only a predetermined order of inputs is required by processor array 30.

Host system 10 includes a host processor 11, programmed to perform certain "global" calculations, which are described below in connection with FIGS. 2-4. Host system 10 also includes a memory 12, which may be any of a number of well known digital storage devices, and stores data used for the calculations of this inventions, as well as instructions used by processor 11. The instructions stored in memory 12 may be in whatever programing language is appropriate for the equipment being used. Eventually, as is the case with higher level computer languages, the instructions are reduced to micro-instructions usable by processor 11.

Host system 10 further includes an I/O unit 13, such as is associated with any number of well known peripheral devices 13a and 13b, including devices whereby data may be input to the system by the user and output from the system for use by the user. For example, input device 13a may be a keyboard and output device 13b may be a display.

Array control unit 14 causes data to move through the processor array 30 in a regular manner. Specifically, array control unit 14 includes a timer, so that each processor 31 performs certain operations on the data it received in response to the previous signal, and then moves the result to the next processor 31. Thus, the input is "pushed" one variable at a time, rather than being loaded to a memory location. This permits each processor 31 to have a minimum of memory and minimizes communication time. Array control unit 14 may also include control devices for altering the number of processors connected to processor array 30 at any one time.

Interface unit 20 is used to communicate data between host system 10 and processor array 30. Because of the highly parallelized calculations described herein, interface unit 20 may include buffer memory for temporary data storage. In any event, interface 20 provides the means for supplying appropriate data from host system 10 to the inputs of processor array 30 and for receiving the output data from processor array 30 for use by host system 10. Typically, data selection is with shift registers 9 (not shown) associated with each processor 31.

Processor array 30 is an attached processor array, comprised of a number of linearly connected processors 31. The overall mode of the processor array 30 is a clocked sequential network. The number of processors used for a particular calculation may vary, and as will be evident from the discussion below, the invention does not have significant hardware demands.

Processor array 30 is timed to operate in a systolic manner, i.e., for bidirectional pipelining. In other words, processors 31 are linearly connected such that they are activated repeatedly in a regular pattern. Each processor has two horizontal inputs, x and y, and two horizontal outputs, x and y. Each processor 31 also has a vertical input, z. As used herein, "horizontal" and "vertical" refer to the direction of the data with respect to the movement of the data within processor array 30. As explained below, the horizontal data represents vector values, which are constantly available along the horizontal inputs and outputs of each processor 31. The vertical data represents matrix coefficient values, which are provided to each processor 31.

The primary requirement of each processor 31 is that it be capable of carrying out calculations in accordance with the algorithms described herein. Although the invention could be implemented with any one of a number of commercially available processors, the invention may also be realized with a hardwired logic circuit for each processor 31. In such an embodiment, each processor 31 is configured to perform a multiply-add operation. In general, as indicated in FIG. 1, each processor 31 performs three functions, $f_1$, $f_2$, and $f_3$, whose operation is discussed below. Processors 31 need not be hardwired, however, and may be any one of a number of well known instruction set type processors, and will include registers standard to all microprocessors, such as program counter and instruction registers.

In each unit time interval, each processor 31 shifts the data on its input lines, computes a new value, and makes the input values and the result of the computation available as outputs. Thus, whenever a processor 31 receives a set of new inputs, it multiples its vertical and one horizontal input, adds the product to the other horizontal hand input, and sends the result in the direction of the later input. The relationship of this multiply-add operation to the matrix calculations that are the subject of this invention are discussed below in connection with FIGS. 2-5.

Each processor 31 is a Moore machine, i.e., the output is a function of the present state only, as opposed to being a function of the present state and the input. All outputs are latched and the logic is clocked so that when several processors 31 are interconnected, the changing output of one processor 31 during a time interval does not interfere with the input to another during the same time interval.

Figure 1A:
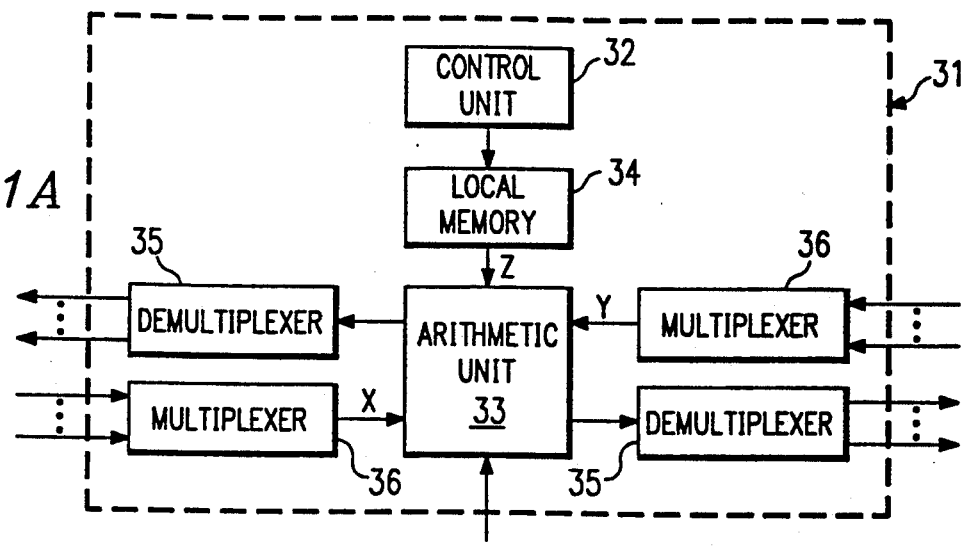
FIG. 1A is an alternative configuration of a processor used with the computer system of FIG. 1.

FIG. 1A illustrates an alternative configuration for each processor 31, in which each processor 31 has a control unit 32 that controls its operations and permits it to be used either as part of processor array 30 or independently, or in parallel but not horizontally pipelined, as desired. Arithmetic unit 33 performs the multiply-add operations required for the invention, as well as other operations, according to instructions as directed by control unit 32. Each processor 31 also has a multiplexer 36 for each horizontal input and a demultiplexer 35 for each horizontal output. Local memory 34 provides local storage for data and instructions.

Referring again to FIG. 1, processor array 30 is illustrated as an attached array used with a full fledged host system 10. However, this is not necessary to implement the invention, and host system 10 could be comprised of a host processor 11 in communication with processor array 30, such that these components are part of a larger general purpose computer system.

Orthogonalization of Vectors

Figure 4:
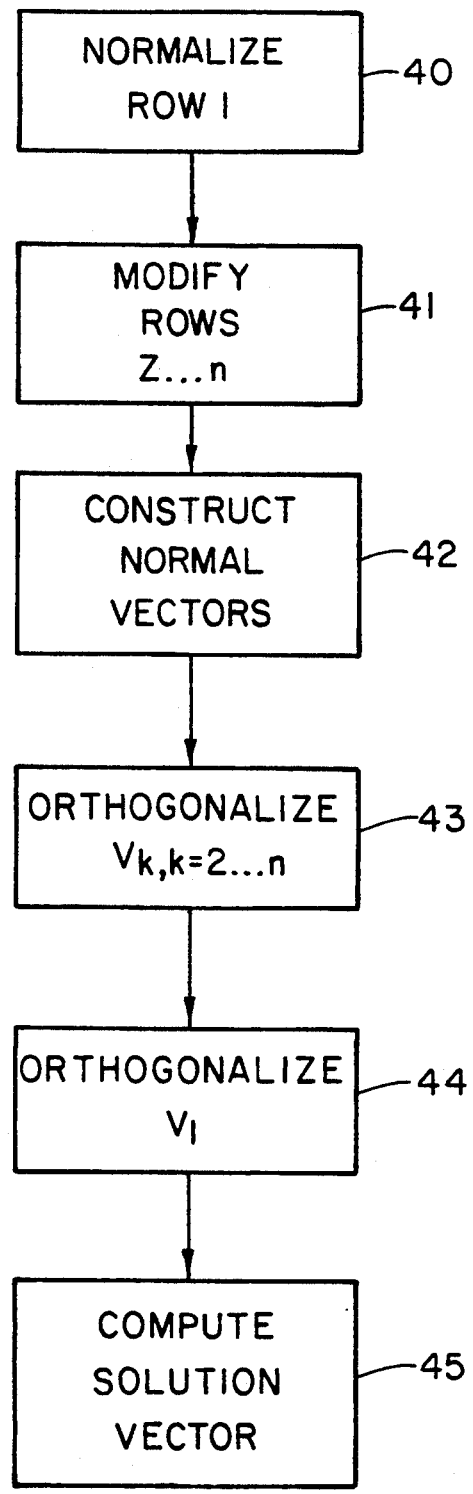
FIG. 4 is a flow diagram of the steps of solving a system of linear equations, using the orthogonalization process of FIG. 2.
Figure 5:
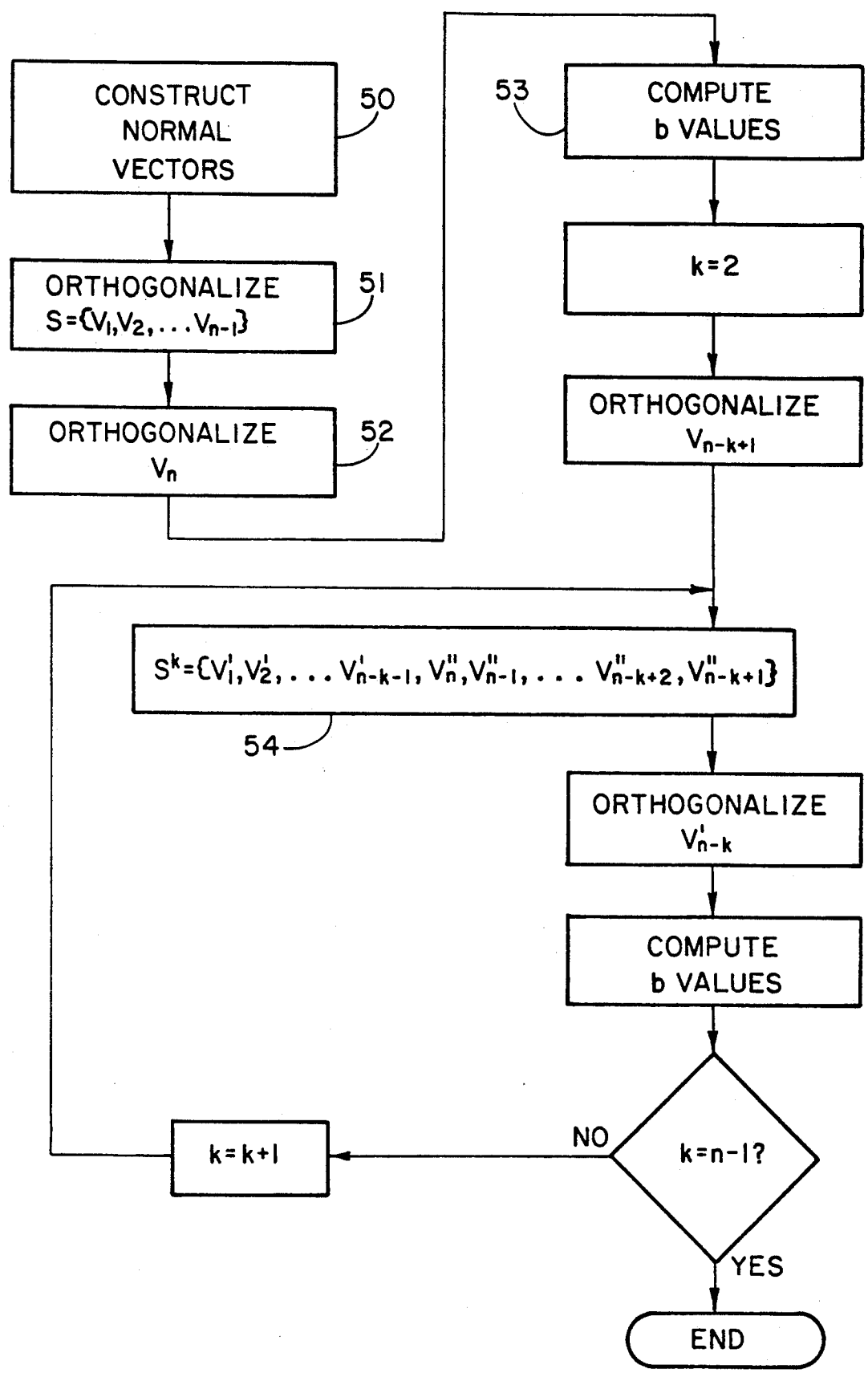
FIG. 5 is a flow diagram of the steps of inverting a matrix, using the orthogonalization process of FIG. 2.

A basic concept of the invention is that certain matrix calculations can be speeded up on a computer system if the calculations use vector orthogonalization techniques. FIG. 2 and 3, which are discussed in this section, illustrate the process of using a computer system to orthogonalize a vector. FIGS. 4 and 5, discussed in the next two sections, apply this process to solving systems of linear equations and to matrix inversion.

The vector orthogonalization rule is that given a set of n independent vectors $\{B_1, B_2, \ldots B_n\}$, a set of vectors $\{A_1, A_2, \ldots A_n\}$ can be calculated, such that vector set A is orthogonal to and span the same space of vector set B. The calculations for obtaining A from B are:

$$A_1 = B_1$$
$$A_2 = B_2 - \frac{<B_2 \cdot A_1> A_1}{<A_1 \cdot A_1>}$$
$$\vdots$$
$$A_n = B_n - \frac{<B_n \cdot A_1> A_1}{<A_1 \cdot A_1>} -$$
$$\frac{<B_n \cdot A_2> A_2}{<A_2 \cdot A_2>} - \cdots - \frac{<B_n \cdot A_{n-1}> A_{n-1}}{<A_{n-1} \cdot A_{n-1}>}$$

This method is consistent with an orthogonalization technique known as Gram-Schmidt orthogonalization. As shown in FIG. 2, the invention permits these calculations to be performed in parallel steps or in a pipelined manner using processor array 30.

Thus, in accordance with the above orthogonalization rule, step 21 is equating $A_1 = B_1$. This is a global calculation that may be performed on host system 10.

Once $A_1$ is obtained, step 22 is computing $<B_2 \cdot A_1>$, $<B_3 \cdot A_1>$, ... $<B_n \cdot A_1>$, in parallel, using processor array 30. For this operation, each processor 31 is configured for matrix-vector multiplication, which can be performed in parallel. Once each $A_1$ is computed, the computation of $<B_{1+1} \cdot A_1>$, $<B_{1+2} \cdot A_1>$, ... $<B_n \cdot A_1>$ is speeded up as a multi-location of a $(n-1) \times (n)$ matrix with a $(n \times 1)$ vector. In other words, row vectors are multiplied times column vectors. This matrix-vector multiplication is performed using multiply-add operations with the recurrences:

$$y_i^{(1)} = 0$$

$$y_i^{(k+1)} = y_i^{(k)} + a_{ik} x_k$$

$$y_i = y_i^{(n+1)}$$

where the a values represent the coefficients of a matrix to be multiplied by the vector $x = (x_1, x_2, \ldots x_n)$. The result is the solution vector $y = (y_1, y_2, \ldots y_n)$.

Figure 3:
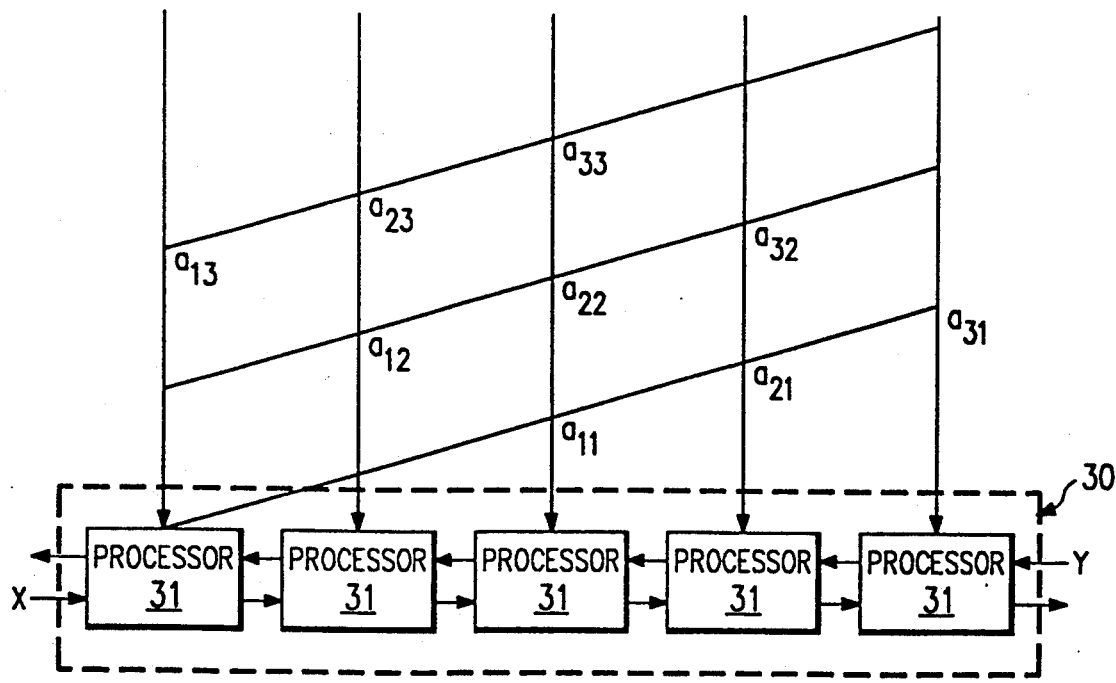
FIG. 3 illustrates the flow of data to and from the processors of the processor array of FIG. 1, when used for orthogonalizing vectors.

FIG. 3 illustrates an example of parallelization of step 22. The matrix-vector multiplication operates on a $3 \times 3$ matrix, with coefficients $a_{ij}$, and a $3 \times 1$ vector, $(x_1, x_2, x_3)$. The elements of x and y are pipelined though processor array 30, which consists of $2n-1$ linearly conducted processors 31. The functions computed by each processor 31 are:

$$f_1(x,y,z) = x$$

$$f_2(x,y,z) = y$$

$$f_3(x,y,z) = z + xy$$

The $y_i$, which are initially zero, move to the left, the $x_i$ move to the right, and the $a_{ij}$ move down. Each $y_i$ accumulates all its terms before it leaves processor array 30.

As long as $n - 1 >> k$, where k is the number of processors 31, this pipelining speeds up the computations. If the number of processors 31 is smaller than n, the $n \times n$ matrix may be decomposed into $k \times k$ matrices. Also, the more general problem of computing $Ax + d$ can be solved by initializing each $y_i$ as $d_i$.

Step 23, which may begin as soon as $<B_2 \cdot A_1>$ has been computed, is computing $$\alpha = \frac{<B_2 \cdot A_1>}{<A_1 \cdot A_1>}.$$

Each of the corresponding quotient terms $$\frac{<B_{1+1} \cdot A_1>}{<A_1 \cdot A_1>}$$

is similarly calculated.

Step 24 is performing the calculation of $A_2 = B_2 - \alpha A_1$. This calculation requires vector subtraction, which can be speeded up on processor array 30. Each processor 31 performs the functions, $f_1(x,y,z)$, $f_2(x,y,z)$ and $f_3(x,y,z)$, whose variables correspond to the inputs and whose resulting values correspond to the outputs shown in FIG. 1.

By performing the above orthogonalization process on a processor array 30 having k processors, it is possible to obtain a linear speedup of a factor of k. The number of vectors to be orthogonalized and the number of components in each vector do not impose a restriction on k. A large matrix can be decomposed into submatrices whose size is compatible with the number of processors 31.

Systems of Linear Equations

One application of the orthogonalization process discussed above is directed to solving a system of linear equations, in which the number of equations is the same as the number of unknowns. FIG. 4 illustrates the steps of this aspect of the invention.

A system of n linear equations in n unknowns, $x_1, x_2, \ldots, x^n$, may be generalized in the following form:

$$a_{11} x_1 + a_{12} x_2 + \ldots + a_{1n} x_n = b_1,$$
$$a_{21} x_1 + a_{22} x_2 + \ldots + a_{2n} x_n = b_2,$$
$$\vdots$$
$$a_{n1} x_1 + a_{n2} x_2 + \ldots + a_{nn} x_n = b_n$$

In this system, $a_{ij}$ and $b_i$ are given values for $i = 1, 2, \ldots n$, and $j = 1, 2, \ldots n$. For each coefficient, $a_{ij}$, the index i indicates in which equation of the system the number occurs, and the index j indicates the unknown with which it is associated.

In matrix notation, the same system of equations is expressed as:

$$A x = b.$$

where A is an n×n matrix of coefficients and b is a vector of n constants. The solution is the unknown n×1 vector, x.

Step 40 is to normalize the first row of the matrix by dividing each element of the row by the constant associated with the first row. Thus, $$a_{lj}' = a_{ij}/b_l$$

, where $j=1,2,\ldots n$. Without loss of generality, it is assumed that $b_l \neq 0$. Although it is not necessary, for ease of calculation, $b_l = \max\{b_i\}$.

Step 41 is modifying the remaining rows of the matrix by subtracting from each coefficient, the product of the constant term for that row times the coefficient of the normalized first two that is in the same column. This is accomplished by the following operation on each coefficient: $a_{kj}' = a_{kj} - b_k a_{lj}'$, where $k=2, 3, \ldots n$ and $j=1, 2, \ldots n$. The result is that, except for $b_l$, the constant term of each equation in the system is zero.

Combining the results of steps 40 and 41, the system of equations to be solved now has the following form:

$$a_{11}'x_1 + a_{12}'x_2 + \ldots + a_{1n}'x_n = 1$$
$$a_{21}'x_1 + a_{22}'x_2 + \ldots + a_{2n}'x_n = 0$$
$$\vdots$$
$$a_{n1}'x_1 + a_{n2}'x_2 + \ldots + a_{nn}'x_n = 0$$

Step 42 is expressing the coefficients of the above equations as the set of vectors:

$$v_1 = (a_{11}', a_{12}', \ldots a_{1n}')$$
$$v_2 = (a_{21}', a_{22}', \ldots a_{2n}')$$
$$v_3 = (a_{31}', a_{32}', \ldots a_{3n}')$$
$$\vdots$$
$$v_n = (a_{n1}', a_{n2}', \ldots a_{nn}')$$

, where the first vector is referred to as the "normalized vector" and the remaining vectors as the "zero constant vectors".

Step 43 is orthogonalizing the zero constant vectors with respect to each other using the orthogonalization process discussed above in connection with FIG. 2. The pipelined process permits a substantial speedup of execution time.

Step 44 is orthogonalizing $v_1$ with respect to $v_2, v_3, \ldots v_n$ to obtain $v_{perpendicular}$ ($v_{perp}$). This is accomplished by the following operation:

$$v_{perp} = v_1 - \frac{<v_1 \cdot v_2>v_2}{<v_2 \cdot v_2>} - \frac{<v_1 \cdot v_3>v_3}{<v_3 \cdot v_3>} - \ldots \frac{<v_1 \cdot v_n>v_n}{<v_n \cdot v_n>}$$

This orthogonalization process can also be pipelined on processor array 30. The basis for step 44 is that if V is a finite dimensional inner product space and $\{A_1, \ldots A_k\}$ are an orthogonal set of vectors in V, then there are vectors $\{A_{k+1}, \ldots A_l\}$ such that $\{A_1, A_2, \ldots A_k, A_{k+1}, \ldots A_l\}$ is an orthogonal basis for V, where l is the dimension of V. Thus, since $v_2, v_3, \ldots v_n$ are n-dimensional vectors, there is a vector $v_{perp}$ such that $\{v_{perp}, v_2, \ldots v_n\}$ forms a basis for the n-dimensional inner product space.

Once $v_{perp}$ is obtained, step 46 computes $x = (x_1, x_2, \ldots x_n)$, as follows:

$$x = \frac{1}{<v_1 \cdot v_{perp}>} v_{perp}$$

The scalar quotient is referred to herein as a scaling value.

Steps 40, 41, and 45 can be linearly speeded up by using processors 31 in parallel. Furthermore, because of the parallel nature of the orthogonalization process, steps 43 and 44 can be implemented on processor array 30 configured for matrix-vector operations.

As an example of the foregoing method, the following system of equations may be solved in accordance with steps 40 –45:

$$x = 2y + 3z = 6$$

$$-3x + z = 0$$

$$-2x + y = 0$$

The desired solution, calculated by well known methods in the prior art, is $x=1$, $y=2$, $z=3$. To simplify the calculations, $v_1$ is assumed to be $(1, 0, 0)$. Modification of the calculations in steps 44 and 45 compensate for the correct values of $v_1$. To illustrate steps 42, the $v_2$ and $v_3$ vectors are:

$$v_2 = (-3, 0, 1)$$
$$v_3 = (-2, 1, 0)$$

Figure 2:
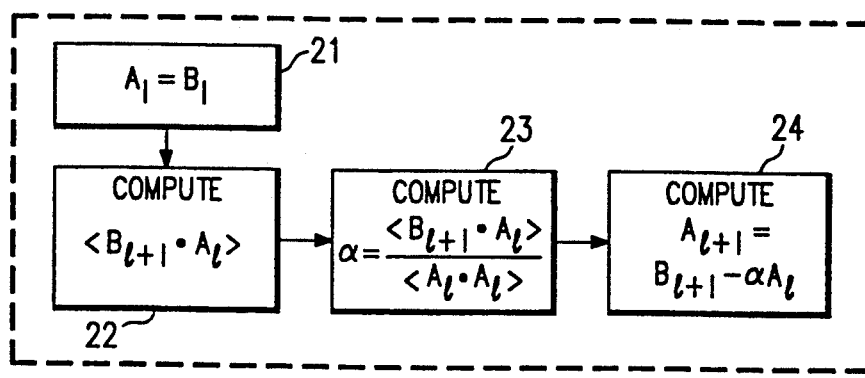
FIG. 2 is a flow diagram of the steps of orthogonalizing vectors in parallel steps, using the processor array shown in FIG. 1.

To illustrate step 43, by orthogonalizing $v_2$ and $v_3$ with respect to each other using the orthogonalization process of FIG. 2, the result is:

$$v_2 = (-3, 0, 1)$$
$$v_3 = (-2, 1, 0) - \frac{<(-3, 0, 1) \cdot (-2, 1, 0)>}{<(-3, 0, 1) \cdot (-, 0, 1)>} (-3, 0, 1)$$
$$= (-2, 1, 0) - 6/10(-3, 0, 1)$$
$$= (-1/5, 1, -3/5)$$

The example illustrates step 44 by obtaining $v_{perp}$ with the simplified values for $v_1$, which is orthogonalized with respect to vectors $v_2$ and $v_3$ to obtain:

$$v_{perp} = (1, 0, 0) - \frac{<(1, 0, 0) \cdot (-3, 0, 1)>}{<(-3, 0, 1) \cdot (-3, 0, 1)>} (-3, 0, 1) -$$
$$\frac{<(1, 0, 0) \cdot (1/5, 1, -3/5)>}{<(-1/5, 1, -3/5) \cdot (-1/5, 1, -3/5)>} (-1/5, 1 \cdot -3/5)$$
$$= (1; 0, 0) + 3/10 (-3, 0, 1) + \frac{1/5}{7/5} (-1/5, 1, -3/5)$$
$$= (1 - 9/10 - 1/35, 1/7, 3/10 - 3/35)$$
$$= 1/70 (70 - 63 - 2, 10, 21 - 6)$$
$$= 1/70 (5, 10, 15)$$

To complete the calculations, the correct values for $v_1$ are included by finding a value for $\beta$ as follows:

$$\beta <(1, -2, 3) \cdot (5/70, 10/70, 15/70)> = 6$$

$$\beta (5/70 - 20/70 + 45/70) = 6$$

$$\beta = 14$$

Thus, for $\beta = 14$, $$\beta v_{perp} = 14/70 \ (5, 10, 15)$$
$$= (1, 2, 3)$$

, and thus, $x=1$, $y=2$, and $z=3$ as expected.

For better understanding of the invention, each equation may be viewed as a plane in n dimensional hyperspace. Except for an equation having zero as a constant, none of these planes pass through the origin. Assuming these equations are independent and simultaneously correct, all these hyperplanes intersect at a single point solution. This solution can be considered as a vector from the origin to that unique solution point.

To solve the equations, all of the equations are normalized such that the constant term is, in general, equal to one, with the planes located as before in hyperspace. Next, one of the equations is subtracted from the others, which results in $n-1$ equations equal to zero. This displaces these $n-1$ planes so that they pass through the origin, but the solution vector is unchanged.

Next, normal lines through each of the $n-1$ planes are described. These lines are vectors from the origin to the points, which are conveniently represented by the coefficients of each of the equations. These $n-1$ normal vectors are, in general, not orthogonal to each other, but are all orthogonal to the solution vector.

Mathematical operations, consistent with the Gramm-Schmidt method of orthogonalization, can now be performed on these $n-1$ vectors. The result is that they are rotated them in hyperspace so that they are orthogonal to each other and remain orthogonal to the solution vector. This operation describes the direction of the solution vector. The intersection of this directional vector with the plane originally subtracted from the other $n-1$ planes determines the unique solution.

Matrix Inversion

In another aspect of the invention, matrix inversion is accomplished using processor array 30 and the orthogonalization process described in connection with FIG. 2. If $A_{ij}$ is a nonsingular matrix and $B_{ij}$ is the inverse of A, it is known, their relationship may be expressed as:

$$\begin{matrix} a_{11} & a_{12} & \cdots & a_{1n} \\ a_{21} & a_{22} & \cdots & a_{2n} \\ \cdot \\ \cdot \\ \cdot \\ a_{n1} & a_{n2} & \cdots & a_{nn} \end{matrix} \begin{matrix} b_{11} & b_{12} & \cdots & b_{1n} \\ b_{21} & b_{22} & \cdots & b_{2n} \\ \\ \\ \\ b_{n1} & b_{n2} & \cdots & b_{nn} \end{matrix} = \begin{matrix} 1 & 0 & \cdots & 0 \\ 0 & 1 & \cdots & 0 \\ \\ \\ \\ 0 & 0 & \cdots & 1 \end{matrix}$$

The above corresponds to n linear systems of equations of the type:

$$\begin{matrix} a_{11} & a_{12} & \cdots & a_{1n} \\ a_{21} & a_{22} & \cdots & a_{2n} \\ \cdot \\ \cdot \\ \cdot \\ a_{n1} & a_{n2} & \cdots & a_{nn} \end{matrix} \begin{matrix} b_{1k} \\ b_{2k} \\ \\ \cdot \\ \\ b_{nk} \end{matrix} = \begin{matrix} 0 \\ 0 \\ \\ 1 \\ \\ 0 \end{matrix}$$

, for $k=1, 2, \ldots n$, with 1 in the kth position.

The complexity of solving such a system of linear equations is $O(n^3)$, and there are n such equations to solve. Thus, it may seem that the complexity of computing the inverse is increased to $O(n^4)$. Yet, the invention prevents this increased complexity. More specifically, vectors are normalized in a specific order so that only one vector is deleted from the orthogonal set and one vector is added to the remaining set. The complexity remains $O(n^3)$ and is in fact, $2n^3$.

FIG. 5 illustrates the steps of a method of matrix inversion in accordance with the invention. The basic concept of the invention is consistent with the method described above for computing systems of linear equations. The method manipulates the system of equations so that the solution may be obtained by vector orthogonalization, which may be performed on processor array 30 with the process described in connection with FIG. 2.

As will be evident from the following explanation, the essential steps of the method involve separating the problem into a set of matrix-vector problems, where each column of the inverse matrix B is calculated by finding a vector, $S_k$, $k=n, n-1, \ldots 1$, from which another vector, $V_{perp}$ is derived. This $V_{perp}$ vector is then used to determine the b coefficient values for the column in question.

To compute the nth column of the inverse, the problem is expressed as:

$$a_{1,1} b_{1,n} + a_{1,2} b_{2,n} + \ldots + a_{1,n} b_{n,n} = 0$$
$$a_{2,1} b_{1,n} + a_{2,2} b_{2,n} + \ldots + a_{2,n} b_{n,n} = 0$$
$$\cdot$$
$$\cdot$$
$$\cdot$$
$$a_{n,1} b_{1,n} + a_{n,2} b_{2,n} + \ldots + a_{n,n} b_{n,n} = 1$$

, which has the same form as the equation set obtained in steps 40 and 41 of the method for solving linear equations.

Step 50 of the method of FIG. 5 is defining the $a_{ij}$ matrix coefficients as the set of vectors:

$$v_1 = (a_{11}, a_{12}, \ldots a_{1n})$$
$$v_2 = (a_{21}, a_{22}, \ldots a_{2n})$$
$$\cdot$$
$$\cdot$$
$$v_n = (a_{n1}, a_{n2}, \ldots a_{nn})$$

, referred to herein as the vector set S.

In step 51, to determine column n of B, the vectors in the set of vectors, $S = \{v_1, v_2, \ldots v_{n-1}\}$, are orthogonalized with respect to each other, obtaining $S^1 = \{v_1', v_2', \ldots v_{n-1}'\}$. This step follows the orthogonalization process described above in connection with FIG. 2.

In step 52, $v_n$ is orthogonalized with respect to the set of vectors, $S^1$. The result if $v_{perpendicular}(1)$ ($v_{perp}(1)$). Again, the orthogonalization follows the process described above, and is performed on processor array 30.

In step 53, a set of vectors $\{b_{1n}, b_{2n}, \ldots b_{n-1,n}\}$ is calculated by solving:

$$\frac{1}{<v_n \cdot v_{perp}(1)>} v_{perp}(1)$$

This set of vectors represents the $n^{th}$ column of the inverse.

Steps 54–56 compute the $n-1^{th}$, $n-2^{th}$, ...$1^{th}$ columns of the inverse. For example, for the $n-1^{th}$ column, in step 54, the vector $v_{n-1}'$ is removed from the vector set $S^1$, and the vector $v_n'$ is added by orthogonalizing it with respect to $v_1'$, $v_2'$, ...$v_{n-2}'$ to obtain $S^2 = \{v_1', v_2', \ldots v_{n-2}', v_n'\}$. Step 55 is obtaining $v_{perp(2)}$ by orthogonalizing $v_{n-1}'$ with respect to $S^2$. Step 56 is computing the next row of matrix coefficients:

$$b_{n-1,n-1}, b_{1,n-1}, b_{2,n-1}, \ldots b_{n-2,n-1}, b_{n,n-1} = \frac{1}{<v_{n-1}' \cdot v_{perp(2)}>} v_{perp(2)}$$

Similar coefficients are repeated for each of the remaining columns. At each $k^{th}$ loop, the set of vectors is modified to obtain $S^k$, $v_{perp(k)}$ is calculated by orthogonalizing $v_{n-k}'$ with respect to the set $S^k$, and the next row of coefficients is computed.

The parallel nature of steps 54–56 is shown by the calculations:

$$v_n'' = v_n' + \frac{<v_n' \cdot v_{n-k}'>}{<v_{n-k}' \cdot v_{n-k}'>} v_{n-k}'$$

$$v_{n-1}'' = v_{n-1}' + \frac{<v_{n-1}' \cdot v_{n-k}'>}{<v_{n-k}' \cdot v_{n-k}'>} v_{n-k}'$$

$$\vdots$$

$$v_{n-k+2}'' = v_{n-k+2}' + \frac{<v_{n-k+2}' \cdot v_{n-k}'>}{<v_{n-k}' \cdot v_{n-k}'>} v_{n-k}',$$

and:
$$S_{k+1} = \{v_1', v_2', \ldots v_{n-k-1}', v_n'', v_{n-1}'', \ldots v_{n-k+2}'', v_{n-k+1}'\}$$

, where $v_{n-k+1}$ is obtained by orthogonalizing $v_{n-k+1}$ with respect to $\{v_1', v_2', \ldots v_{n-k-1}', v_n'', v_{n-1}'', \ldots v_{n-k+2}''\}$. Also, $v_{perp(k)}$ is obtained by orthogonalizing $v_{n-k}$ with respect to the vectors of the set $S_{k+1}$. Then, the $n-k^{th}$ column of the inverse is computed as follows:

$$(b_{n-k,n-k}, b_{1,n-k}, b_{2,n-k}, \ldots b_{n-k-1,n-k},$$

$$b_{n,n-k}, b_{n-1,n-k}, \ldots b_{n-k+1,n-k}) = \frac{1}{<v_{n-k}' \cdot v_{perp(k)}>} v_{perp(k)}.$$

In this manner, all columns of the inverse are obtained.

Other Embodiments

Although the invention has been described with reference to specific embodiments, this description is not meant to be construed in a limiting sense. Various modifications of the disclosed embodiments, as well as alternative embodiments of the invention will be apparent to persons skilled in the art. It is, therefore, contemplated that the appended claims will cover all modifications that fall within the true scope of the invention.

What is claimed is:

1. A method performed by a multiprocessor computer system for solving a system of linear equations, wherein said multiprocessor computer system comprises at least a host processor and a processor array, comprising the steps of:

receiving said system of linear equations by said host processor, said host processor expressing said system of linear equations as a matrix having rows and columns of coefficient values, wherein each row is equal to a known constant;

transferring said coefficient values by said host processor to said processor array;

controlling said processor array to normalize a row of said matrix, to obtain a normalized vector and to modify the remaining rows of said matrix to obtain zero constant vectors;

orthogonalizing said zero constant vectors with respect to each other and then orthogonalizing said normalized vector with respect to said orthogonalized zero constant vectors, to obtain a perpendicular vector, wherein said steps of orthogonalizing are performed by multiple processors of said processor array;

obtaining a solution vector by said processor array as the product of a scaling factor and said perpendicular vector; and receiving of said solution vector by said host processor.

2. The method of claim 1, wherein said step of modifying the remaining rows of said matrix comprises the step of subtracting from each of said coefficient values, the product of the constant term for that row times the normalized coefficient in the same column as the coefficient.

3. The method of claim 1, wherein said step of orthogonalizing said zero constant vectors further comprises the step of performing said step of orthogonalizing said zero constant vectors on said array, wherein said array is a linearly connected array of processors.

4. The method of claim 1, wherein said step of orthogonalizing said normalized vector further comprises the step of performing said step of orthogonalizing said normalized vector on said array, wherein said array is a linearly connected array of said processors.

5. The method of claim 1, wherein said normalizing step comprises the step of operating said processors in parallel.

6. The method of claim 1, wherein said step of modifying said rows comprises the step of operating said processors in parallel.

7. The method of claim 1, wherein said step of obtaining the solution vector comprises the step of computing said scaling factor from the inverse of the scalar product of said perpendicular vector and said normalized vector.

8. The method of claim 1, wherein said step of obtaining said solution vector comprises the step of operating said processors in parallel.

9. The method of claim 1, wherein said method further comprises the steps of orthogonalizing said normalized vector and said zero constant vectors on an array of linearly connected processors and configuring said processor array so that the number of processors is $2n-1$, where n represents the number of equations to be solved.

10. A method performed by a multiprocessor computer system for performing a matrix inversion, wherein such system comprises at least a host processor and a processor array, comprising the steps of:

receiving an inverted matrix and a noninverted matrix by said host processor, said host processor expressing unknown values of the inverted matrix as unknown values associated with corresponding values of the noninverted matrix;

transferring said unknown values expressed by said host processor to said processor array;

controlling said processor array to normalize and modify rows of said matrix, to obtain a normal vector and a set of zero constant vectors;

obtaining an initial column of coefficients of said inverted matrix by the processor array performing the substeps of:

orthogonalizing said zero constant vectors to obtain a first orthogonalized vector set, orthogonalized said normal vector with respect to said orthogonalized vector set to obtain a first perpendicular vector, and obtaining the initial column as the product of said first perpendicular vector and a first scaling value;

obtaining each next column of coefficients of said inverted matrix by the processor array performing the substeps of:

modifying said first orthogonalized vector set by removing a first zero constant vector and adding a next zero constant vector, and wherein said next zero constant vector is orthogonalized with respect to said first orthogonalized vector set, thereby obtaining a next orthogonalized vector set, orthogonalizing said first removed vector with said next orthogonalized vector set to obtain a next perpendicular vector, and obtaining the next column values as the product of said next perpendicular vector and a next scaling value; and receiving a solution vector by said host processor as the product of a predetermined scaling factor and said perpendicular vector.

11. The method of claim 10, wherein said step of orthogonalizing said zero constant vectors further comprises the step of performing said step of orthogonalizing said zero constant vectors on said array, wherein said array is a linearly connected array of processors.

12. The method of claim 10, wherein said step of orthogonalizing said normal vector further comprises the step of performing said step of orthogonalizing said normalized vector on said array, wherein said array is a linearly connected array of said processors.

13. The method of claim 10, wherein said step of orthogonalizing said next orthogonalized vector further comprises the step of performing said step of orthogonalizing said next orthogonalized vector on said array, wherein said array is a linearly connected array of processors.

14. The method of claim 10, wherein said step of orthogonalizing said perpendicular vector further comprises the step of performing said step of orthogonalizing said perpendicular vector on said array, wherein said array is a linearly connected array of said processors.

15. The method of claim 10, wherein the method further comprises the step of obtaining said next scaling value from the inverse of the scaler product of said next orthogonalized vector times said next perpendicular vector.

16. A multiprocessor computer system for solving a system of linear equations, said multiprocessor computer system comprising:

a host processor;

a processor array;

means for receiving said system of linear equations by said host processor, said host processor expressing said system of linear equations as a matrix having rows and columns of coefficient values, wherein each row is equal to a known constant;

means for transferring said coefficient values by said host processor to said processor array;

means for controlling said processor array to normalize a row of said matrix, to obtain a normalized vector;

means for modifying the remaining rows of said matrix to obtain zero constant vectors;

means for orthogonalizing said zero constant vectors with respect to each other and then orthogonalizing said normalized vector with respect to said orthogonalized zero constant vectors, to obtain a perpendicular vector;

means for obtaining a solution vector by said processor array as the product of a scaling factor and said perpendicular vector; and means for receiving of said solution vector by said host processor.

17. The multiprocessor computer system of claim 16, wherein said means for modifying the remaining rows of said matrix comprises means for subtracting from each of said coefficient values, the product of the constant term for that row times the normalized coefficient in the same column as the coefficient.

18. The multiprocessor computer system of claim 16, wherein said means for orthogonalizing said zero constant vectors further comprises a linearly connected array of processors.

19. The multiprocessor computer system of claim 16, wherein said means for orthogonalizing said normalized vector further comprises a linearly connected array of said processors.

20. The multiprocessor computer system of claim 16, wherein said means for controlling comprises means of operating said processors in parallel.

21. The multiprocessor computer system of claim 16, wherein said means for modifying said rows comprises means for operating said processors in parallel.

22. The multiprocessor computer system of claim 16, wherein said means for obtaining the solution vector comprises means for computing said scaling factor from the inverse of the scalar product of said perpendicular vector and said normalized vector.

23. The multiprocessor computer system of claim 16, wherein said means for obtaining said solution vector comprises means for operating said processors in parallel.

24. The multiprocessor computer system of claim 16, wherein said multiprocessor computer system further comprises means for orthogonalizing said normalized vector and said zero constant vectors on an array of linearly connected processors and configuring said processor array so that the number of processors is $2n-1$, where n represents the number of equations to be solved.

25. A multiprocessor computer system for performing a matrix inversion, said multiprocessor computer system comprising:

a host processor;

a processor array;

means for receiving an inverted matrix and a noninverted matrix by said host processor, said host processor expressing unknown values of the inverted matrix as unknown values associated with corresponding values of the noninverted matrix;

means for transferring said unknown values expressed by said host processor to said processor array;

means for controlling said processor array to normalize and modify rows of said matrix to obtain a normal vector and a set of zero constant vectors;

means for obtaining an initial column of coefficients of said inverted matrix by the processor array;

means for orthogonalizing said zero constant vectors to obtain a first orthogonalized vector set, means for orthogonalizing said normal vector with respect to said orthogonalized vector set to obtain a first perpendicular vector;

means for obtaining the initial column as the product of said first perpendicular vector and a first scaling value;

means for obtaining each next column of coefficients of said inverted matrix by the processor array;

means for modifying said first orthogonalized vector set by removing a first zero constant vector and adding a next zero constant vector, and wherein said next zero constant vector is orthogonalized with respect to said first orthogonalized vector set, thereby obtaining a next orthogonalized vector set;

means for orthogonalizing said first removed vector with said next orthogonalized vector set to obtain a next perpendicular vector;

means for obtaining the next column values as the product of said next perpendicular vector and a next scaling value; and means for receiving a solution vector by said host processor as the product of a predetermined scaling factor and said perpendicular vector.

26. The multiprocessor computer system of claim 25, wherein said means for orthogonalizing said zero constant vectors further comprises a linearly connected array of processors.

27. The multiprocessor computer system of claim 25, wherein said means for orthogonalizing said normal vector further comprises a linearly connected array of said processors.

28. The multiprocessor computer system of claim 25, wherein said means for orthogonalizing said next orthogonalized vector further comprises a linearly connected array of said processors.

29. The multiprocessor computer system of claim 25, wherein said means for orthogonalizing said perpendicular vector further comprises a linearly connected array of said processors.

30. The multiprocessor computer system of claim 25, wherein the multiprocessor computer system further comprises means for obtaining said next scaling value from the inverse of the scaler product of said next orthogonalized vector times said next perpendicular vector.

31. A method performed by a multiprocessor computer system for solving a system of linear equations, wherein said multiprocessor computer system comprises at least a host processor and a processor array, comprising the steps of:

coupling said host processor to said processor array;

receiving said system of linear equations by said host processor, said host processor expressing said system of linear equations as a matrix having rows and columns of coefficient values, wherein each row is equal to a known constant;

transferring said coefficient values by said host processor to said processor array;

controlling said processor array to normalize a row of said matrix, to obtain a normalized vector and to modify the remaining rows of said matrix to obtain zero constant vectors;

orthogonalizing said zero constant vectors with respect to each other and then orthogonalizing said normalized vector with respect to said orthogonalized zero constant vectors, to obtain a perpendicular vector, wherein said steps of orthogonalizing are performed by multiple processors of said processor array;

obtaining a solution vector by said processor array as the product of a scaling factor and said perpendicular vector; and receiving of said solution vector by said host processor.

32. A method performed by a multiprocessor computer system for solving a system of linear equations, wherein said multiprocessor computer system comprises at least a host processor and a processor array, comprising the steps of:

receiving said system of linear equations by said host processor, said host processor expressing said system of linear equations as a matrix having rows and columns of coefficient values, wherein each row is equal to a known constant;

transferring first signals corresponding to said coefficient values from said host processor to said processor array;

controlling said processor array to normalize a row of said matrix, to obtain a normalized vector and to modify the remaining rows of said matrix to obtain zero constant vectors;

orthogonalizing said zero constant vectors with respect to each other and then orthogonalizing said normalized vector with respect to said orthogonalized zero constant vectors, to obtain a perpendicular vector, wherein said steps of orthogonalizing are performed by multiple processors of said processor array;

obtaining a solution vector by said processor array as the product of a scaling factor and said perpendicular vector; and transferring a second signal corresponding to said solution vector from said processor array to said host processor.

* * * * *